US010537152B2

(12) United States Patent
Campbell et al.

(10) Patent No.: US 10,537,152 B2
(45) Date of Patent: Jan. 21, 2020

(54) SHOE ASSEMBLY WITH NON-LINEAR VISCOUS LIQUID

(71) Applicant: Brooks Sports, Inc., Seattle, WA (US)

(72) Inventors: Derek Campbell, Seattle, WA (US); Pete Humphrey, Mill Creek, WA (US); Vaikunthanathan Veeriah, Seattle, WA (US)

(73) Assignee: Brooks Sports, Inc., Seattle, WA (US)

( * ) Notice: Subject to any disclaimer, the term of this patent is extended or adjusted under 35 U.S.C. 154(b) by 20 days.

(21) Appl. No.: 16/028,322

(22) Filed: Jul. 5, 2018

(65) Prior Publication Data

US 2019/0000181 A1 Jan. 3, 2019

Related U.S. Application Data

(63) Continuation of application No. 14/176,383, filed on Feb. 10, 2014, now Pat. No. 10,016,016, which is a continuation of application No. 13/523,154, filed on Jun. 14, 2012, now Pat. No. 8,661,709, which is a continuation of application No. 12/464,048, filed on May 11, 2009, now Pat. No. 8,209,885.

(51) Int. Cl.
| | |
|---|---|
| *B29D 35/12* | (2010.01) |
| *A43B 13/18* | (2006.01) |
| *A43B 13/04* | (2006.01) |
| *A43B 13/02* | (2006.01) |
| *A43B 1/14* | (2006.01) |
| *A43B 7/14* | (2006.01) |
| *B29C 44/02* | (2006.01) |
| *B29D 35/14* | (2010.01) |

(52) U.S. Cl.
CPC .............. *A43B 13/189* (2013.01); *A43B 1/14* (2013.01); *A43B 7/144* (2013.01); *A43B 7/1425* (2013.01); *A43B 7/1435* (2013.01); *A43B 7/1445* (2013.01); *A43B 13/02* (2013.01); *A43B 13/04* (2013.01); *A43B 13/187* (2013.01); *B29C 44/02* (2013.01); *B29D 35/12* (2013.01); *B29D 35/122* (2013.01); *B29D 35/142* (2013.01)

(58) Field of Classification Search
CPC .... A43B 1/00; A43B 1/10; A43B 1/14; A43B 13/00; A43B 13/04; A43B 13/18; A43B 13/187; A43B 13/188; B29D 35/142; B29D 35/122; B29D 35/12
USPC .......................................... 12/142 R, 146 B
See application file for complete search history.

(56) References Cited

U.S. PATENT DOCUMENTS 5,667,895 A * 9/1997 Jenkner ................ A43B 13/187
251/263
5,985,383 A * 11/1999 Allen ..................... A42B 3/121
36/88

(Continued)

*Primary Examiner* — Marie D Bays
(74) *Attorney, Agent, or Firm* — Perkins Coie LLP

(57) ABSTRACT

Shoes and shoe sole assemblies and associated methods of manufacture are disclosed herein. One aspect of the invention is directed toward a shoe and shoe sole assembly made of a non-linearly viscous, SEBS block copolymer-based material that becomes more resilient as more energy is applied. The shoe and shoe sole assembly is configured with a heel and forefoot insert configured to fit within a recess in a midsole. In other embodiments, the non-linearly viscous, SEBS block copolymer-based material is mixed with at least one other polymer in a foam. The midsole is formed with a heel impact region and a forefoot region made of the foam.

7 Claims, 4 Drawing Sheets

(56) References Cited

U.S. PATENT DOCUMENTS

| | | | | |
|---|---|---|---|---|
| 7,237,346 | B2* | 7/2007 | Lebo | A43B 7/144 36/28 |
| 7,278,226 | B2* | 10/2007 | Holden | A43B 7/1425 36/103 |
| 7,381,460 | B2* | 6/2008 | Palmer | A41D 13/015 428/304.4 |
| 7,608,314 | B2* | 10/2009 | Plant | A41D 31/285 428/86 |
| 7,666,918 | B2* | 2/2010 | Prieto | C08J 9/00 521/144 |
| 8,008,363 | B2* | 8/2011 | Mori | A43B 13/04 36/25 R |
| 8,209,885 | B2* | 7/2012 | Campbell | A43B 7/1425 36/28 |
| 8,661,709 | B2* | 3/2014 | Campbell | A43B 7/1425 36/28 |
| 2003/0101621 | A1* | 6/2003 | Nishiwaki | A43B 7/144 36/30 R |
| 2003/0216815 | A1* | 11/2003 | Christensen | A61F 2/7843 623/37 |
| 2004/0003513 | A1* | 1/2004 | Crane | A43B 7/1415 36/29 |
| 2004/0006148 | A1* | 1/2004 | Harris | C08J 9/12 521/50 |
| 2004/0068893 | A1* | 4/2004 | Kendall | A43B 7/1465 36/88 |
| 2004/0181970 | A1* | 9/2004 | Covatch | A43B 7/1425 36/30 R |
| 2005/0000116 | A1* | 1/2005 | Snow | A43B 3/128 36/28 |
| 2005/0160626 | A1* | 7/2005 | Townsend | A43B 7/144 36/30 R |
| 2005/0268490 | A1* | 12/2005 | Foxen | A43B 7/1425 36/28 |
| 2006/0026868 | A1* | 2/2006 | Grisoni | A43B 7/1425 36/71 |
| 2006/0154998 | A1* | 7/2006 | Shiba | A43B 13/04 521/142 |
| 2006/0234572 | A1* | 10/2006 | Wagner | C08L 71/02 442/59 |
| 2007/0151124 | A1* | 7/2007 | Chan | A43B 7/144 36/35 R |
| 2008/0073923 | A1* | 3/2008 | Miura | B62D 29/002 296/1.03 |
| 2008/0271340 | A1* | 11/2008 | Grisoni | A43B 7/142 36/43 |
| 2009/0000148 | A1* | 1/2009 | Simmons | A43B 7/141 36/28 |
| 2010/0028568 | A1* | 2/2010 | Weaver | C09D 123/02 428/17 |
| 2010/0048752 | A1* | 2/2010 | Vignola | C08J 3/246 521/139 |
| 2010/0287796 | A1* | 11/2010 | Koo | A43B 13/12 36/30 R |
| 2010/0292403 | A1* | 11/2010 | Ansems | C08F 8/32 525/125 |
| 2011/0154584 | A1* | 6/2011 | Ungari | B29D 35/122 12/146 B |
| 2011/0214310 | A1* | 9/2011 | Rosenbaum | A43B 13/18 36/28 |

* cited by examiner

SHOE ASSEMBLY WITH NON-LINEAR VISCOUS LIQUID

CROSS-REFERENCE TO RELATED APPLICATIONS

This application is a continuation of U.S. patent application Ser. No. 14/176,383, filed Feb. 10, 2014, now issued as U.S. Pat. No. 10,016,016, which is a continuation of U.S. patent application Ser. No. 13/523,154, filed Jun. 14, 2012, now issued as U.S. Pat. No. 8,661,709, which is a continuation of U.S. patent application Ser. No. 12/464,048, filed May 11, 2009, now issued as U.S. Pat. No. 8,209,885, all of which are herein incorporated by reference in their entireties.

TECHNICAL FIELD

Embodiments of the present disclosure relate to shoes and shoe assemblies with non-linear viscous liquid components.

BACKGROUND

Shoes of all types are subject to great amounts of stress through repeated, cyclical loading caused by walking, running, and other activities. Athletic shoes generally experience even more acute stress due to the higher impact levels associated with athletic activities. The repeated impact of a high-intensity gait causes great wear and even break-down of many shoes. In addition, the impact is stressful to the wearer's body. Without proper support and cushioning, the foot, ankle, calf, knee, and even hip joints are challenged physically by athletic activity. Proper alignment of joints, bones, and muscles of the foot, leg, and hip is crucial. A shoe that is improperly constructed, worn down, or improperly calibrated to the activity can cause off-axis loading of joints and bones. Off-axis loading can cause fatigue and tension to the wearer.

There have been many attempts to create a shoe sole that provides a durable, long lasting, and reliable support to the wearer throughout even the most vigorous athletic activity. Many conventional materials generally sacrifice responsiveness for comfort, or comfort for responsiveness. Also, most materials are best suited either for stressful, high-impact activity such as running, or toward lower-level activities such as standing or walking. Many of previous attempts place a bladder or insert in the sole containing air, gel, plastic, or other material to absorb energy from impact. These materials generally cannot provide a range of response characteristics to different levels of pressure and impact. In other words, a softer soled shoe that may be well suited for standing and walking is not properly calibrated for higher-impact levels. Similarly, a stiffer shoe that may provide proper resiliency and performance for running or other high-energy activities is generally not well suited—even uncomfortable or painful—for lower level activities.

Some attempts have been made to provide a shoe with dilatant (i.e., shear-thickening) materials in the sole. These materials increase in viscosity as a function of the rate of shear (e.g., silly putty). Dilatant materials, however, are generally not accurately calibrated to the responsiveness required for multiple levels of activity to provide optimal responsiveness and comfort. Also, dilatant materials cannot be readily injection molded or compression molded, increasing the complexity and cost of manufacture. There is a need for a shoe assembly that can meet the needs of both high- and low-intensity activities without sacrificing comfort or performance.

DETAILED DESCRIPTION

Figure 1:
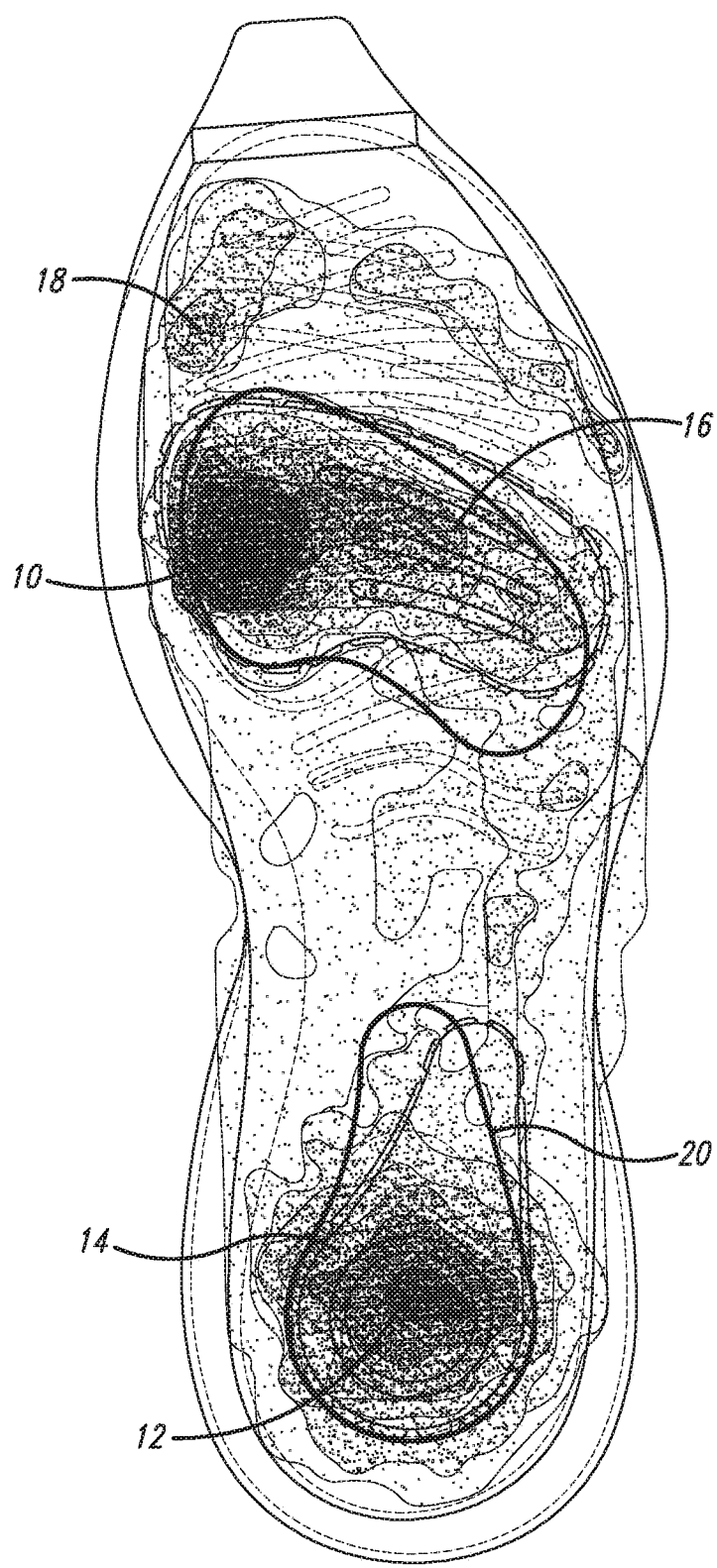
FIG. 1 is an isometric illustration of an impact pattern of a footstep during an average gait.

Aspects of the present disclosure are directed generally toward shoes and shoe assemblies and associated methods of manufacture, including shoe components made of non-linearly viscous materials. One aspect of the present disclosure is directed toward a shoe sole assembly comprising an insert, such as a heel insert made of a non-linearly viscous, SEBS block copolymer-based material. The heel insert of one embodiment has a generally curved teardrop shape with a generally circular heel portion, and a tapered protrusion extending forward from the heel portion. The shoe assembly can also includes a forefoot insert similarly made of a non-linearly viscous, SEBS block copolymer-based material. The forefoot insert of one embodiment is a contoured insert that comprises a generally oval-shaped portion positioned under an inside metatarsal of a foot, and an arcing protrusion extending laterally outwardly from the oval-shaped portion. The forefoot extension is configured in an arcing shape to substantially underlie the metatarsals of the wearer's foot. A midsole is configured to receive the heel insert and the forefoot insert.

Other aspects of the present disclosure are directed to a shoe sole with a midsole portion having a heel impact region, and a forefoot impact region. At least one of the heel impact region and the forefoot impact region is formed of a non-linearly viscous, SEBS block copolymer-based material blended into a foam with at least one other polymer.

Other aspects of the present disclosure are directed to methods of manufacturing a shoe sole assembly, including forming a midsole with at least one recess configured to receive at least one insert, and molding at least one insert from a non-linearly viscous, SEBS block copolymer-based material to fit within the at least one recess. A top surface of the insert and the midsole form an insole configured to receive a foot. In some embodiments, the insole and/or sockliner can also be made of a non-linearly viscous material, and can be made with the same manufacturing techniques disclosed herein.

Still other aspects of the present disclosure are directed to methods of manufacturing a shoe sole. The methods include mixing a non-linearly viscous, SEBS block copolymer-based material with at least one other polymer to create a foam, and molding the foam into a shoe sole with a heel impact region and a forefoot impact region. The methods also include forming a midsole to receive the heel impact region and the forefoot impact region, wherein the midsole, the heel impact region, and the forefoot impact region comprise an insole surface configured to receive a foot.

Various embodiments of the disclosure will now be described. The following description provides specific details for a thorough understanding and enabling description of these embodiments. One skilled in the art will understand, however, that the disclosure may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the disclosure. Certain terms may even be emphasized below; however, any terminology intended to be interpreted in any restricted manner will be overtly and specifically defined as such in this Detailed Description section.

References throughout the specification to "one embodiment" or "an embodiment" means that a particular feature, structure, or characteristic described in connection with the embodiment and included in at least one embodiment of the present disclosure. Thus, the appearances of the phrase "in one embodiment" or "in an embodiment" in various places throughout the specification are not necessarily all referring to the same embodiment. Furthermore, the particular features, structures, or characteristics may be combined in any suitable manner in one or more embodiments.

FIG. 1 illustrates a traditional foot impact pattern during a footstep of a normal gait cycle. The darkest portions 10 and 12 correspond to the area between the first and second metatarsal, and the heel, respectively. Understandably, these are the areas of high impact during a normal gait cycle. Lighter regions 14 and 16 show areas of slightly lesser impact surrounding the heel and under the third, fourth, and fifth metatarsal. The impact pattern follows generally the arcing pattern of the metatarsal heads, or the balls of the foot. Other impact areas are the toe areas 18 and a region 20 forward of the heel and toward the outer edge of the foot print. The pattern of these impact regions illustrates the need for impact absorption or energy return at these crucial areas. FIG. 1 depicts a traditional, average impact pattern. Throughout this disclosure, reference is made to an impact pattern; however, it is to be appreciated that different activities will cause higher or lower impact, and/or impact in different patterns than that shown in FIG. 1. The features of the present disclosure can be applied to shoes for use with different activities by different users, wherein the associated impact pattern is different without departing from the scope of this disclosure.

Figure 2:
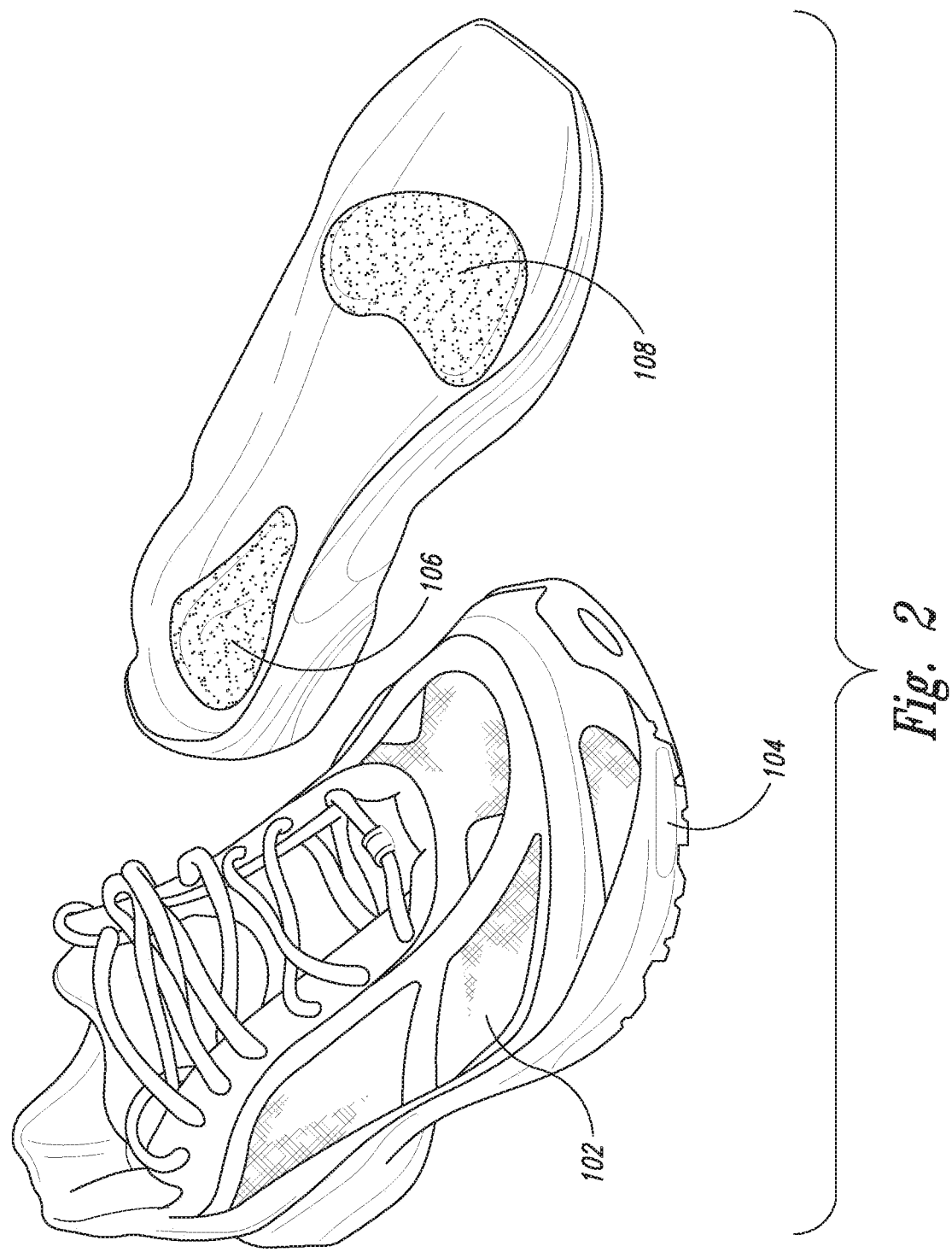
FIG. 2 is an illustration of a pair of shoes according to the present disclosure.

FIGS. 2-5B illustrate various features of a shoe assembly in accordance with various embodiments of the disclosure. FIG. 2 is an illustration of a pair of running shoes 100 in accordance with the present disclosure. The shoes contain an upper 102 and a sole 104. The sole contains a heel insert 106 and a forefoot insert 108. The heel insert 106 and forefoot insert 108 are positioned beneath the heel and forefoot, respectively, of the wearer of the shoes 100. The inserts 106 and 108 are generally configured to match impact regions of a human foot. Generally, the areas of highest impact during a gait cycle are under heel and under the first and second metatarsal heads of the forefoot. The inserts 106 and 108 have a thickness generally corresponding to the level of typical or potential impact loads at these regions, whereby portions of the inserts portions under the areas typically subjected to the highest loads are thicker than the portions under the portions of the foot typically subjected to lower loads. The inserts 106 and 108 will be described in more detail below. It is to be appreciated that the shoes 100 depicted here are for illustration purposes only, and that the present disclosure applies to shoes of all types.

Figure 3:
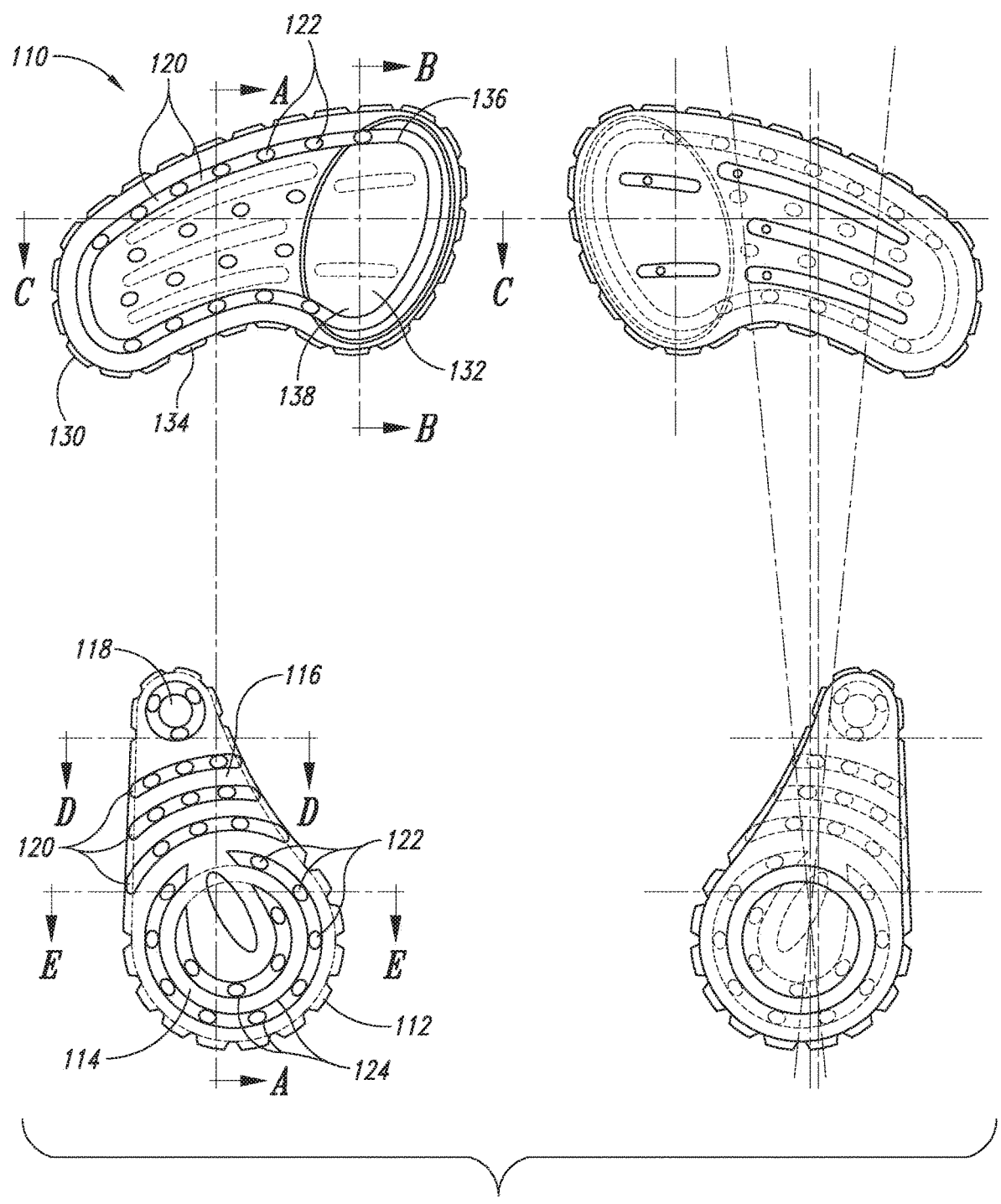
FIG. 3 is a top view of a left and right heel and forefoot shoe assembly inserts in accordance with several embodiments of the present disclosure.

FIG. 3 is a top view of left and right shoe inserts 110 according to the present disclosure. While at times the present disclosure discusses a left or right shoe/foot, it is to be appreciated that the left and right shoe assembly features may or may not be mirrored in the right shoe assembly. According to selected embodiments of the present disclosure, the left heel insert 112 comprises a generally circular region 114 positioned under the heel of the wearer. A tapered protrusion 116 extends forwardly from the circular region 114. The shape of the heel insert 112 generally corresponds to the impact regions experienced by a human foot during a normal gait cycle. As is shown in FIG. 3, the tapered protrusion 116 generally follows the outer portion of the foot near the heel between the heel and forefoot. The tapered protrusion 116 terminates with a rounded tip 118.

The heel insert 112 comprises a plurality of channel recesses 120 and pin recesses 122. The shape, depth, configuration, and layout of these recesses 120 and 122 can vary according to design preferences. The recesses 120 and 122 generally provide greater flexibility and reduce the weight of the insert 112. Some of the recesses 120 and 122 can extend upward from the bottom of the insert 112 and some downward from the top of the insert 112, or all can extend from the top or the bottom. In some embodiments, the recesses 120 and 122 are generally configured to match impact patterns from the foot. In this example, the recesses 124 are positioned in a circular pattern around the generally circular region 114. In some embodiments, the recesses 120 and 122 can comprise sealed cavities in the insert 112 to prevent adhesive and other materials from filling or contaminating the recesses 120 and 122.

The forefoot insert 130 comprises a generally oval-shaped portion 132, and an arcing protrusion 134 that extends in an arc from the oval-shaped portion 132. The shape of the arc can generally match the shape of metatarsal heads of the human foot, such that the forefoot insert 130 provides maximum support to the areas of highest impact on the forefoot. The oval-shaped portion 132 is angled slightly, with the front portion 136 inward of the rear portion 138. The forefoot insert 130 can contain channel recesses 120 and pin recesses 122 similar to those in the heel insert 112.

Figure 4A:
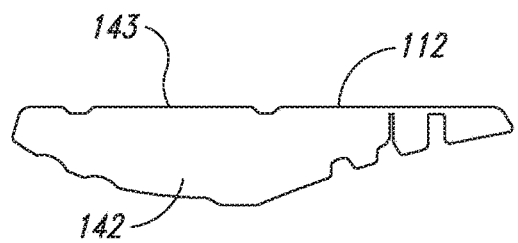
FIG. 4A is a cross-sectional side view of a heel insert in accordance with several embodiments of the present disclosure.
Figure 4B:
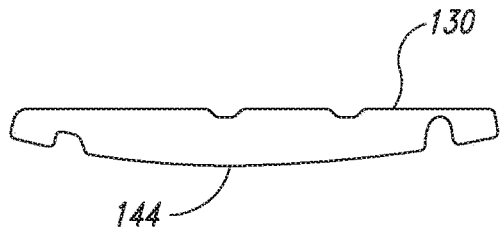
FIG. 4B is a cross-sectional side view of a forefoot insert in accordance with several embodiments of the present disclosure.

FIG. 4A is a cross-sectional side elevation view of the heel insert 112 in accordance with several embodiments of the present disclosure. The heel insert 112 comprises a convex protrusion 142 extending downwardly from the insert 112, and a top surface 143 that is generally flat. The thickness and shape of the convex protrusion 142 can vary depending on the intended application range of the shoe, and depending on the material of the inserts 112 and 130. FIG. 4B is a cross-sectional side view of the forefoot insert 130 according to several embodiments of the present disclosure. In this embodiment, the forefoot insert 130 also has a convex protrusion 144. In comparison to the convex protrusion 142 of the heel insert 112 in FIG. 4A, the protrusion 144 of the forefoot insert 130 is smaller. In other embodiments in which the inserts are configured for a different use involving more impact at the forefoot than at the heel, the forefoot insert 130 may be thicker and have a more pronounced dome-shaped profile 144. For example, activities such as cycling and dancing may involve more impact on the forefoot and less impact on the heel. For such activities, the forefoot insert 130 can be thicker than the heel insert 112. The heel insert 112 and the forefoot insert 130 are positioned in the sole assembly at locations and orientations that substantially correspond to the high impact regions of the human foot during a normal gait cycle, thereby absorbing the impact forces and other loads transferred to the wearer's bones, muscles, and joints during the gait. Accordingly, off-axis joint and skeletal loading to the wearer is significantly reduced, particularly during strenuous, high impact activities, such as running and other athletic activities.

In other embodiments of the present disclosure, the inserts can extend across substantially the entire insole of the shoe. In these embodiments the inserts can have a thicker region at the heel and the forefoot in substantially the same pattern as that depicted in FIG. 3. Other embodiments can include heel and forefoot inserts substantially shaped and configured in FIG. 3 with the heel and forefoot inserts connected by a thin connection piece for ease of manufacture, transport, and assembly. It is to be appreciated that the inserts shown in FIG. 3 are an example of an impact pattern of a footstep during an activity such as running or walking. It is also to be appreciated that inserts according to the present disclosure that are intended for different uses with different impact patterns can be shaped according to the impact pattern of the activity. For example, driving an automobile may place pressure at the rear of the heel as the driver operates the pedals and the clutch—an impact pattern not experienced during a normal walking gait. Inserts accommodating this type of irregular impact pattern are within the scope of the present disclosure.

Figure 5A:
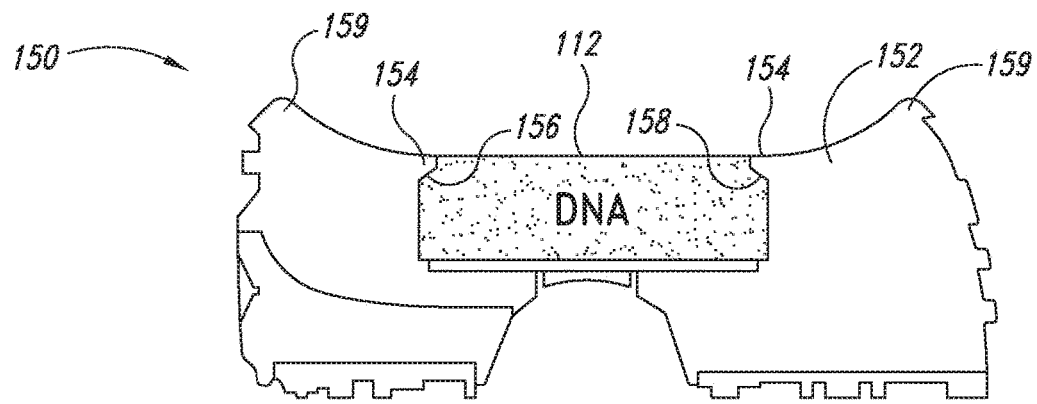
FIG. 5A is a cross-sectional rear view of a midsole and heel insert in accordance with several embodiments of the present disclosure.

FIG. 5A is a cross-sectional rear view of a shoe assembly 150 in accordance with the present disclosure. A midsole 152 is configured to receive a heel insert 112 in a recess of the midsole 152. Although a heel insert 112 is shown in FIG. 5A, similar features can be applied to inserts of other types including forefoot inserts. In some embodiments, the midsole 152 comprises lips 154 that extend over a portion of the insert 112 to hold the insert 112 in place. Other locking engagements with other shapes and configurations can be positioned elsewhere in the midsole 152. The insert 112 can include a mating element such as a shoulder 156 configured to receive the lips 154 (or other locking engagement). An adhesive can be used to reinforce the attachment between the midsole 152 and the insert 112. In some embodiments, the shoulder 156 can extend from the insert 112 a uniform distance around the perimeter of the insert 112. In other embodiments the dimensions of the shoulder 156 (and corresponding lips 154) can vary around the perimeter of the insert 112. For example, the shoulder 156 can be larger or smaller at the sides than it is at the front and rear edges. Or the shoulder 156 can be larger or smaller at the inside and front than it is at the outside and rear. The various shoulder dimensions can improve the adhesion of the lips 154 and the shoulder 156 with or without an adhesive. The stress at different regions may be different depending on how the shoe assembly 150 is used. Accordingly, the shoulder 156 and lips 154 can be sized to resist these stresses so that the insert 112 is securely held in the midsole 152.

Figure 5B:
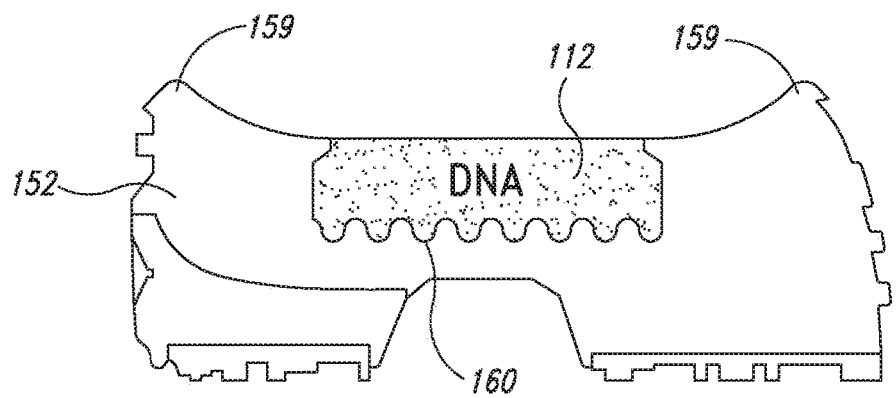
FIG. 5B is a cross-sectional rear view of a midsole and heel insert in accordance with several embodiments of the present disclosure.

Midsole perimeter portions 159 extend generally around the perimeter of the midsole 152 and are configured to receive the foot of a wearer and to improve comfort and arch support. The top of the insert 112 is generally flat and in some embodiments is substantially flush with the surface of the midsole 152. In other embodiments, an insole layer (not shown) is placed over the midsole 152 and the insert 112. The recess in the midsole 152 is shaped such that the insert 112 fits within the midsole 152. Although the midsole 152 is shown here with a generally concave surface to receive the convex protrusion 142 of the insert 112, it will be appreciated that different embodiments can have different configurations, including a concave surface with a larger or smaller radius than that depicted here, or with a flat or convex shape. For example, FIG. 5B is a cross-sectional view of a forefoot insert 130 and a midsole 152 in accordance with the present disclosure in which the midsole 152 has a cross-sectional shape 160 that mates with a similar, negative shape on the bottom of the insert 112. The forefoot insert 130 is received within a similar recess in another portion of the midsole 152. As discussed above, the forefoot insert 130 can have various shapes and sizes depending on the intended application or style.

The inserts 112 and 130 described above are constructed of a non-linearly viscous material, such as product numbers LC 331-178 or LC 331-138 manufactured by GLS Corporation. These materials are SEBS (Styrene-ethylene-butadiene-styrene) block copolymer based materials. The material's resiliency is a function of a level of impact to the material. This material allows an athletic shoe, for example, to feel soft and absorb energy while walking, but when the wearer begins to run or otherwise impact the material the shoe stiffens and provides desired energy return to the wearer's gait. The material will continue to respond to increased impact levels as the runner speeds up. The resiliency is a function of speed and force of the steps of the wearer, and of the weight of the wearer. A heavier runner at one speed may cause a higher level of resilience in the material than a lighter runner at the same speed.

The inserts are durable and flexible. They resiliently return to their unloaded shape when the impact is removed between footsteps. During a normal gait cycle the heel and forefoot inserts are loaded differently. The primary force on the heel insert is the downward force from the heel which compacts the insert, while a significant force is applied to the forefoot insert when it is flexed as the wearer pushes off from the ground. Both inserts return this energy to the gait when the impact is high by springing the wearer's heel back upward or propelling the wearer forward. When the impact is low, the inserts revert back to their softer, more energy-absorbing state where the energy return is correspondingly (and appropriately) less. The higher the impact of the gait, the more energy is returned to the gait. The result is a shoe that is comfortable to wear for walking without sacrificing higher-end performance for running or training.

Absorbing energy and returning energy according to impact energy provides several advantages. The wearer experiences both comfort and performance without sacrificing either. The energy return and absorption provides greater stability to the wearer during the gait by reducing off-axis loading. There is less stress to joints in the foot, knee, and hip because the moments placed on the foot are lessened by the reduction of off-axis loading. Because of the material, the shoes provide cushioning and support at the right times and in the right places. The feel of the shoe is tuned to individual runners and walkers because the resiliency of the material factors in weight and activity and responds appropriately to each.

In addition to the energy-return advantages provided by the material's resiliency, the material and configurations of the present disclosure can be positioned and configured to provide stability to a wearer's gait. Excessive off-axis loading can be caused by pronation of the wearer's foot. The footwear can be designed to include the non-linear viscous material in the form of inserts or other structural components including formed integrally within a midsole substantially as discussed above, in selected positions to counteract pronation or supination to provide stability to the wearer's gait. Similar to the action described above, the material's increased stiffness and resiliency at higher-impact levels will increase the stability protection provided by the shoes. Thus, a runner who pronates (or supinates) slightly while walking but more heavily while running or jumping causes the material to respond to the higher impact levels and counteract the heavier pronation (or supination).

One additional advantage of this material is that, unlike dilatant materials, it can be made into the various shapes through injection molding or compression molding. These are well-known and cost-effective methods of manufacture, so shoes made by these methods are less expensive to manufacture. The midsole 152 and other components of the shoe assembly can be constructed from an alpha olephin polymer blend, a polyolefin polymer blend, or from a polymer alloy with polyolefins. These materials can also be injection molded or compression molded into shape.

The above embodiments include a midsole and an insert made of disparate materials. In other embodiments the SEBS material can be incorporated into a foam with at least one other material, such as at least one of the materials used in previous embodiments for the midsole, or another polymer material. The materials can be mixed together into a foam which can be injection molded or compression molded into shape. In some embodiments the foam is limited to the heel and forefoot region in substantially the same regions covered by the inserts of FIGS. 4A, 4B, 5A, and 5B. In other embodiments the SEBS material is more heavily concentrated in the high impact regions and may be distributed as a function of impact level of an average gait (which may vary depending on the activity) but is not limited to those regions. In still other embodiments the SEBS material can be distributed in an even or other selected distribution pattern throughout the foam and therefore throughout the sole of the shoe.

The above-detailed embodiments of the disclosure are not intended to be exhaustive or to limit the disclosure to the precise form disclosed above. Specific embodiments of, and examples for, the disclosure are described above for illustrative purposes, but those skilled in the relevant art will recognize that various equivalent modifications are possible within the scope of the disclosure. For example, whereas steps are presented in a given order, alternative embodiments may perform steps in a different order. The various aspects of embodiments described herein can be combined and/or eliminated to provide further embodiments. Although advantages associated with certain embodiments of the disclosure have been described in the context of those embodiments, other embodiments may also exhibit such advantages. Additionally, not all embodiments need necessarily exhibit such advantages to fall within the scope of the disclosure.

Unless the context clearly requires otherwise, throughout the description and the claims, the words "comprise," "comprising," and the like are to be construed in an inclusive sense as opposed to an exclusive or exhaustive sense, i.e., in a sense of "including, but not limited to." Additionally, the words "herein," "above," "below," and words of similar import, when used in this application, shall refer to this application as a whole and not to any particular portions of this application. Use of the word "or" in reference to a list of items is intended to cover a) any of the items in the list, b) all of the items in the list, and c) any combination of the items in the list.

In general, the terms used in the following claims should not be construed to limit the invention to the specific embodiments disclosed in the specification unless the above-detailed description explicitly defines such terms. In addition, the inventors contemplate various aspects of the disclosure in any number of claim forms. Accordingly, the inventors reserve the right to add claims after filing the application to pursue such additional claim forms for other aspects of the disclosure.

We claim:

1. A method of manufacturing a shoe sole, comprising:
   mixing a non-linearly viscous, SEBS block copolymer-based material with at least one other polymer to create a foam;
   molding the foam into a heel impact region and a forefoot impact region; and
   forming a midsole to receive the heel impact region and the forefoot impact region, wherein the midsole, the heel impact region, and the forefoot impact region comprise an insole surface configured to receive a foot.

2. The method of claim 1 wherein molding comprises at least one of injection molding and compression molding.

3. The method of claim 1 wherein mixing comprises mixing the non-linearly viscous, SEBS block copolymer-based material in a higher concentration than the at least one other polymer in at least one of the heel impact region or the forefoot impact region.

4. The method of claim 1 wherein molding comprises molding the heel impact region and the forefoot impact region into discrete segments, and forming the midsole comprises forming a plurality of recesses and placing the discrete segments into the recesses.

5. The method of claim 1, further comprising attaching the midsole to an upper.

6. The method of claim 1 wherein the at least one other polymer comprises at least one of an alpha olephin blend, a polyolefin blend, and a polymer alloy with polyolefins.

7. The method of claim 1 wherein forming the midsole comprises mixing the foam with the midsole to form a continuous shoe sole.

* * * * *